(12) United States Patent
Yan et al.

(10) Patent No.: US 10,550,518 B2
(45) Date of Patent: Feb. 4, 2020

(54) METHOD FOR CONTROLLING HYDROPHOBIC PARTICLES IN AQUEOUS ENVIRONMENT IN PAPER OR BOARD MANUFACTURE

(71) Applicant: Kemira Oyj, Helsinki (FI)

(72) Inventors: Li Yan, Shanghai (CN); Zeming Bai, Suzhou (CN)

(73) Assignee: Kemira Oyj, Helsinki (FI)

( * ) Notice: Subject to any disclaimer, the term of this patent is extended or adjusted under 35 U.S.C. 154(b) by 80 days.

(21) Appl. No.: 15/739,743

(22) PCT Filed: Jun. 23, 2016

(86) PCT No.: PCT/FI2016/050457
§ 371 (c)(1),
(2) Date: Dec. 24, 2017

(87) PCT Pub. No.: WO2016/207490
PCT Pub. Date: Dec. 29, 2016

(65) Prior Publication Data
US 2018/0187374 A1 Jul. 5, 2018

(30) Foreign Application Priority Data

Jun. 23, 2015 (CN) .......................... 2015 1 0350905
Jul. 7, 2015 (FI) ..................................... 20155537

(51) Int. Cl.
| | | |
|---|---|---|
| *D21H 17/14* | (2006.01) | |
| *D21H 21/06* | (2006.01) | |
| *D21H 11/14* | (2006.01) | |
| *D21H 27/00* | (2006.01) | |
| *D21J 1/00* | (2006.01) | |

(52) U.S. Cl.
CPC ............ *D21H 17/14* (2013.01); *D21H 11/14* (2013.01); *D21H 21/06* (2013.01); *D21H 27/002* (2013.01); *D21J 1/00* (2013.01)

(58) Field of Classification Search
USPC ......................................................... 162/183
See application file for complete search history.

(56) References Cited

U.S. PATENT DOCUMENTS

| 5,914,006 A | 6/1999 | Nellessen et al. |
|---|---|---|
| 2003/0150574 A1 | 8/2003 | Paren et al. |

FOREIGN PATENT DOCUMENTS

| FI | 104339 B | 12/1999 |
|---|---|---|
| RU | 2419700 C2 | 5/2011 |

OTHER PUBLICATIONS

Atkinson, J. et al., Operational efficiency & process innovation, Barcelona Tissue World, Tissue World 2015. Proceedings of a conference held in Barcelona, Spain, Mar. 17-19, 2015. Slides 1-12, especially slide 5.
Search report of FI20155537, Finnish Patent Office, dated Feb. 16, 2016.
European Patent Office, Office Action dated Jan. 24, 2019, EP16736896.8, 4 pages.
Russian Patent Office, Search Report of the corresponding Russian patent application No. 2018101206, dated May 22, 2019, 2 pages.

*Primary Examiner* — Mark Halpern
(74) *Attorney, Agent, or Firm* — Berggren LLP

(57) ABSTRACT

The invention relates to a method for controlling hydrophobic particles in aqueous environment in paper or board manufacture. The method comprises preparing an aqueous stock comprising natural fibrous material, feeding the stock to a wire section, where a fibrous web is formed by draining excess water through a wire, and adding a control chemical to aqueous environment at least in one dosage point between the preparation of the stock and the exit of the web from the wire section. The control chemical comprises performic acid, which is added to the aqueous stock, which has consistency of at least 3 weight-%.

20 Claims, 1 Drawing Sheet

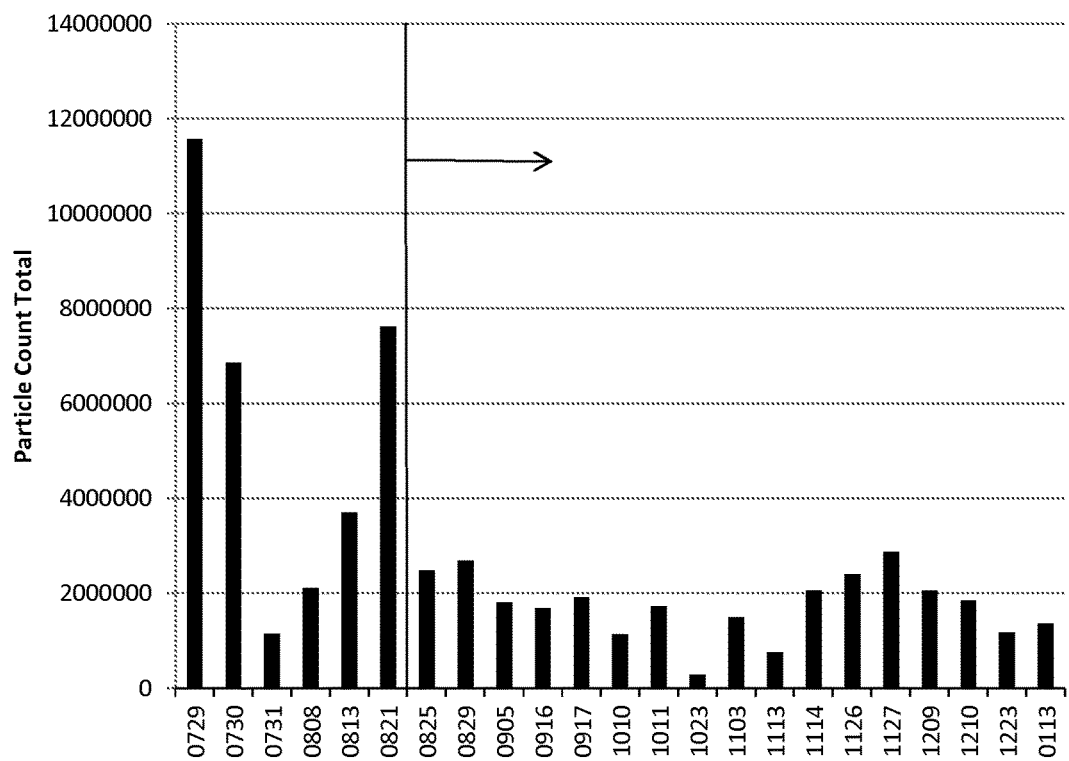

METHOD FOR CONTROLLING HYDROPHOBIC PARTICLES IN AQUEOUS ENVIRONMENT IN PAPER OR BOARD MANUFACTURE

PRIORITY

This application is a U.S national application of PCT-application PCT/FI2016/050457 filed on Jun. 23, 2016 and claiming priority of Chinese application CN 201510350905.6 filed on Jun. 23, 2015 and Finnish application FI 20155537 filed on Jul. 7, 2015, the contents of all of which are incorporated herein by reference.

The invention relates to method for controlling hydrophobic particles in aqueous environment in paper, tissue or board manufacture according to preambles of the enclosed independent claim.

Paper, tissue or board can be produced by using virgin fibres and/or recycled fibres as raw material. In either case, hydrophobic particles enter the production process with the raw materials. For example, virgin fibres may comprise pitch particles and recycled fibres may comprise remains from adhesives, glues, tapes, etc. Consequently there is a constant need to effectively control hydrophobic particles in the paper and board making processes. Especially there is a need to control the hydrophobic particles in production of lightweight paper grades, such as tissue, where the defects in the final product quality are easily observed by the end user.

BRIEF DESCRIPTION OF THE DRAWINGS

FIG. 1 shows the effect of addition of control chemical including performic acid to the total amount of hydrophobic particles in the short loop of the tissue machine.

The hydrophobic particles may agglomerate especially in the tissue manufacturing process, which may lead to increase of the size of the hydrophobic particles and cause defects in the final product. The hydrophobic particles may also accumulate and/or be deposited onto the process surfaces of the production apparatus. This may cause runnability problems and/or further defects in the final product. Furthermore, the consumers are sensitive for defects in tissue paper grades that are used as hygiene tissue.

The object of the present invention is to minimize or even eliminate the disadvantages existing in the prior art.

One object of the present invention is to provide an effective method for controlling or reducing the hydrophobic particles in production of paper, tissue or board, especially in production of tissue.

These objects are achieved by the features disclosed in the independent claim and the invention is defined by the features of the enclosed independent claim. Some preferred embodiments of the present invention are presented in the dependent claims.

Typical method according to the present invention for decreasing, i.e. controlling, hydrophobic particles in aqueous environment in paper or board manufacture comprises:
- preparing an aqueous stock comprising natural fibrous material,
- feeding the stock to a wire section, where a fibrous web is formed by draining excess water through a wire,
- adding a control chemical to the aqueous environment at least in one dosage point between the preparation of the stock and the exit of the web from the wire section, whereby the control chemical comprises performic acid and it is added at least in one dosage point to the aqueous stock, i.e. thick stock, which has consistency of at least 3 weight-%.

Now it has been found that it is possible to control, i.e. decrease, the agglomeration, accumulation and/or deposition of hydrophobic particles in an aqueous environment of paper or board making process by addition of performic acid at least to aqueous thick stock of natural cellulosic fibres. It was unexpectedly observed that the addition of performic acid decreased both the size and amount of hydrophobic particles in the aqueous environment of paper, tissue or board making process, e.g. circulating waters. This decrease in size and amount had a positive effect on hydrophobic deposition in the process, which was noticeably reduced. The mode of interaction between the performic acid and the hydrophobic particles is at present unknown, but it is assumed without wishing to be bound by a theory that the performic acid links or connects with the hydrophobic particles, which leads to their trapping or retention to the fibre web. In this manner the amount of free hydrophobic particles in the aqueous environment of the paper, tissue or board making process is reduced.

In the present context the term "hydrophobic particle" is understood as a hydrophobic particle, often in colloidal form, which is water insoluble and enters the process together with the raw materials or water flows. This means that the hydrophobic particles are preferably present in the aqueous environment and/or in the stock at the time of addition of the control chemical comprising performic acid. Hydrophobic particles are made of a mixture of various organic compounds and substances, and they originate from pitch, adhesives, waxes, wet strength resins, printing inks, organic binders, plastics. The term does not encompass inorganic particles, or hydrophobic slime or the like which is produced under the paper or board making process by various microorganisms, such as bacteria.

After the addition of the control chemical comprising performic acid to the aqueous environment, the performic acid contained in the control chemical interacts with the free hydrophobic particles present in the aqueous environment. This interaction improves the retention of the hydrophobic particles to the fibrous web when the web is formed, as described above. The retention of hydrophobic particles reduces the number of free hydrophobic particles and decreases the process problems caused by hydrophobic particles, e.g. deposition formation.

Performic acid, $CH_2O_3$, is used in the invention as an aqueous solution. Typically the performic acid has a concentration at least 10%, calculated as weight to volume, typically around 13.5%, calculated as weight to volume. Preferably the aqueous performic acid solution is used as an equilibrium solution. Preferably the control chemical consists of an aqueous equilibrium solution of performic acid.

According to one preferable embodiment of the invention the performic acid is produced on-site and led directly to the thick stock flow. A preparation unit for performic acid, which is suitable for use in the present invention, has been designed by Kemira Oyj, Finland. Performic acid may thus be prepared in the immediate vicinity of the process location where it is added to the thick stock. This guarantees the high chemical efficiency of the performic acid. Performic acid is led to the process location through suitable connections and fed in a desired process location at least to the thick stock by using suitable feeding means.

The aqueous stock comprising natural fibrous material is prepared by using virgin cellulosic fibres and/or recycled cellulosic fibre material. According to one embodiment of the invention the stock comprises both softwood and hardwood fibres. For example, the stock may comprise softwood fibres in amount of 15-40 weight-%, preferably 20-30 weight-%, and hardwood fibres in amount of 60-85 weight-%, preferably 70-80 weight-%, calculated from the total amount of fibres as dry. The fibre material used may be bleached chemi-thermo mechanical pulp (BCTMP). According to one embodiment of the invention the natural fibrous material comprises recycled cellulosic fibres. In some embodiments the stock may comprise over 50 weight-% of recycled cellulosic fibres or over 75 weight-% of recycled cellulosic fibres. Sometimes the stock may comprise 100 weight-% of recycled cellulosic fibres, calculated from the total amount of fibres as dry.

Preferably the control chemical comprising performic acid is added to aqueous stock, i.e. thick stock, which has consistency of at least 3 weight-%, preferably at least 3.3 weight-%, more preferably at least 3.5 weight-%.

The added performic acid does not provide significant improvement in brightness of the fibrous stock. Thus the function of the performic acid is not to improve the brightness of the pulp but to interact with the hydrophobic particles present in the fibrous stock at the time of the addition. The brightness change is typically less than 2% ISO, preferably less than 1% ISO, measured according to standards ISO 3688, ISO 2470. The brightness change is the difference between the brightness of the stock measured before the treatment with performic acid and the brightness of the stock measured after the treatment with performic acid.

The prepared stock is fed to a wire section, where a fibrous web is formed by draining excess water through a wire. The produced web may have a grammage of 11-45 $g/m^2$, preferably 13-20 $g/m^2$, especially when the produced web is a tissue web.

According to one preferred embodiment of the invention the paper manufacture process is a tissue process, which employs a tissue machine, and that the produced fibrous web is a tissue web. In this case the web is transferred after the web formation to a single large steam heated cylinder with a fitted hot air hood, on which it is then dried. Preferably the method according to the invention is used for production of hygiene tissue, such as facial tissue, household tissue or toilet paper. The aqueous environment in the process of tissue manufacture may be a pH value in the range of 7.0-8.2, preferably 7.5-8.0. This means that the addition of the control chemical is well-suited for the neutral environment of the process. Preferably the fibre stock in the tissue manufacture is free of internal sizing agents, such as resin size and/or neutral sizes.

The control chemical comprising performic acid may be added to the aqueous environment in two or more dosage points. For example, the control chemical may be added to the aqueous environment at least in one additional dosage point between the preparation of the stock and the exit of the web from the wire section. Preferably the control chemical is added in a plurality of dosage points. Addition of the control chemical in two or more dosage points ensures that the performic acid effectively interacts with the hydrophobic particles, which consequently ensures their improved retention to the formed web in the succeeding process steps.

At least 40%, preferably at least 45%, more preferably at least 50%, of the total amount of the control chemical is added to the thick stock, i.e. to the aqueous stock having consistency of at least 3 weight-%, in one or more dosage points.

According to one preferable embodiment of the invention the water drained through the wire during the web formation is filtered and the control chemical, comprising performic acid, is added also to superclear filtrate from the filtration in one or more dosage points. At least 5%, preferably at least 10%, more preferably at least 15%, of the total amount of the control chemical may be added to the superclear filtrate. After addition of the control chemical the superclear filtrate can be used for preparation of thick stock and/or for diluting the thick stock to thin stock. The control chemical comprising performic acid interacts with the hydrophobic particles and changes their properties so that they are effectively captured or retained on the formed web, which inhibits the enrichment of the hydrophobic particles in the aqueous environment. When control chemical comprising performic acid is added to the superclear filtrate, the superclear filtrate may be used as part of water for preparation and/or diluting the stock and as shower water for keeping the tissue machine clean.

According to one embodiment the control chemical comprising performic acid is added both to the aqueous thick stock and to the superclear filtrate and the dosage to thick stock is higher than to the superclear filtrate. According to one embodiment of the invention the control chemical is added in two or more dosage points, whereby at least 50% of the total performic acid dosage is added to the thick stock, i.e. aqueous stock having consistency of at least 3 weight-%.

According to one embodiment of the invention the amount of hydrophobic particles in the aqueous environment is monitored, either continuously or at predetermined intervals, and the addition of the control chemical is adjusted according to the amount of hydrophobic particles. This means that if it is observed that the amount and/or size of the hydrophobic particles in the process is increasing, the feed amount of the control chemical is temporarily increased in order to reduce the amount and/or size of the hydrophobic particles in the process and the risk for deposition building.

According to one embodiment of invention the control chemical, which comprises performic acid, is added in such amount that the total performic acid dosage is 0.2-2 kg/ton dry pulp, preferably 0.5-1.5 kg/ton dry pulp, more preferably 0.7-0.9 kg/ton dry pulp. The dose is given as 100% performic acid. Total performic acid dosage is the sum of performic acid amount contained in the control chemical dosages, which are done to the aqueous environment between stock preparation and the exit of the web from the wire section as well as to the superclear filtrate. The added amount of performic acid is so low that is does not have any significant effect on, for example, growth of microorganisms. This means that performic acid does not, at least primarily, function as a biocide in the process.

It is also possible to add at least one biocide, which is different from the control chemical, to at least one location, which is selected from the machine silo, headbox, mixing chest and broke chest. Suitable biocides are, for example, methylene bis(thiocyanate), 2,2-dibromo-2-cyanoacetamide, monochloramine, monomethyl hydantoin, glutaraldehyde, isothiazaolinone, didecyldimethylammonium chloride, 2-bromo-2-nitropropane-1,3-diol, suitable derivates thereof and the like.

EXPERIMENTAL

An embodiment of invention is more closely described in the following non-limiting example.

Example 1

A trial was conducted in a tissue mill using a stock comprising 20-30 hardwood and 70-80% softwood. Hydrophobic particles were present in the water circulation of the tissue mill. Their amount and mean particle size was observed by using flow cytometry using selective fluorescence dye to stain the hydrophobic particles.

The control chemical tested was an equilibrium solution of performic acid, peracetic acid and peroxide.

In the trial the control chemical was added to the thick stock of the tissue mill, as well as to the superclear filtrate, the silo and overflow white water from the silo. The total dosage of added control chemical was about 4 kg/ton dry stock in the start of the trial and then the dosage was gradually decreased to about 1.6 kg/ton dry stock.

The results are shown in FIG. 1, which shows the effect of addition of control chemical comprising performic acid to the total amount of hydrophobic particles in the short loop of the tissue machine. The start of the control chemical is indicated with an arrow. It can be see that amount of hydrophobic particles is lower and more stable than before the start of the feed. This means that the hydrophobic particles in the system are easier to manage and the risk for depositions are reduced.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for decreasing hydrophobic particles in an aqueous environment in paper or board manufacture, the method comprising:
    preparing an aqueous stock having therein hydrophobic particles, said aqueous stock comprising a natural fibrous material,
    feeding the stock to a wire section, wherein a fibrous web is formed by draining excess water through a wire,
    adding a control chemical, comprising performic acid, to the aqueous environment at least in one dosage location between the preparation of the stock and the exit of the web from the wire section, and
    subsequently decreasing agglomeration, accumulation and/or deposition of the hydrophobic particles in the aqueous environment in paper or board manufacture by the addition of the performic acid,
    wherein
    the control chemical, comprising the performic acid, is added at least in one dosage location to the aqueous stock, which has consistency of at least 3 weight-%.

2. The method according to claim 1, wherein the hydrophobic particles are present in the aqueous environment at the time of addition of the control chemical.

3. The method according to claim 1, wherein the control chemical comprising performic acid is added to the aqueous environment in two or more dosage locations.

4. The method according to claim 1, wherein at least 40% of the total amount of the control chemical is added to the aqueous stock having consistency of at least 3 weight-%, in one or more dosage locations.

5. The method according to claim 1, wherein the method further comprises the steps filtering the water drained through the wire and adding control chemical also to superclear filtrate from the filtration in one or more dosage locations.

6. The method according to claim 5, wherein at least 5% at of the total amount of the control chemical is added to the superclear filtrate.

7. The method according to claim 5, wherein at least 10% of the total amount of the control chemical is added to the superclear filtrate.

8. The method according to claim 5, wherein at least 15% of the total amount of the control chemical is added to the superclear filtrate.

9. The method according to claim 1, wherein the control chemical is added in such amount that the total performic acid dosage is 0.2-2 kg/ton.

10. The method according to claim 1, wherein the control chemical is added in two or more dosage locations, whereby at least 50% of the total performic acid dosage is added to the aqueous stock having consistency of at least 3 weight-%.

11. The method according to claim 1, wherein the control chemical consists of an aqueous equilibrium solution of performic acid.

12. The method according to claim 1, wherein the paper manufacture process is a tissue process and that the produced fibrous web is a tissue web.

13. The method according to claim 12, wherein the aqueous environment has a pH value in a range of 7.0-8.2.

14. The method according to claim 1, wherein the produced fibrous web has a grammage of 11-45 $g/m^2$.

15. The method according to claim 1, wherein the natural fibrous material comprises recycled cellulosic fibres.

16. The method according to claim 1, wherein the amount of hydrophobic particles in the aqueous environment is monitored, and the addition of the control chemical is adjusted according to the monitored amount of hydrophobic particles.

17. The method according to claim 1, wherein at least one biocide, which is different from the control chemical, is added to at least one location, which is selected from the machine silo, headbox, mixing chest and broke chest.

18. The method according to claim 1, wherein at least 45% of the total amount of the control chemical is added to the aqueous stock having consistency of at least 3 weight-%, in one or more dosage locations.

19. The method according to claim 1, wherein at least 50% of the total amount of the control chemical is added to the aqueous stock having consistency of at least 3 weight-%, in one or more dosage locations.

20. The method according to claim 1, wherein the control chemical is added in such amount that the total performic acid dosage is 0.5-1.5 kg/ton.

* * * * *